United States Patent [19]
Dent

[11] Patent Number: 5,724,666
[45] Date of Patent: Mar. 3, 1998

[54] POLARIZATION DIVERSITY PHASED ARRAY CELLULAR BASE STATION AND ASSOCIATED METHODS

[75] Inventor: Paul W. Dent, Stehag, Sweden

[73] Assignee: Ericsson Inc., Research Triangle Park, N.C.

[21] Appl. No.: 439,116

[22] Filed: May 11, 1995

Related U.S. Application Data

[63] Continuation-in-part of Ser. No. 217,301, Mar. 24, 1994.
[51] Int. Cl.$^6$ .................................................... H04B 1/40
[52] U.S. Cl. ................ 455/562; 455/101; 455/132; 455/272; 342/361; 343/700 MS; 343/890; 370/337; 370/344; 375/299; 375/347
[58] Field of Search .................. 455/33.3, 33.4, 455/33.1, 56.1, 272, 273, 275, 277.1, 277.2, 279.1, 101–103, 132–135; 343/700 MS, 890, 893; 342/361, 371; 370/915, 337, 347, 344; 379/59, 60

[56] References Cited

U.S. PATENT DOCUMENTS

| | | | |
|---|---|---|---|
| 2,992,427 | 2/1961 | Franco | 343/100 |
| 3,835,392 | 9/1974 | Mahner et al. | |
| 4,849,990 | 7/1989 | Ikegami et al. | 375/347 |
| 5,280,631 | 1/1994 | Nakahi et al. | 455/65 |
| 5,321,850 | 6/1994 | Backstrom et al. | 455/139 |
| 5,528,581 | 6/1996 | De Bot | 370/19 |
| 5,548,813 | 8/1996 | Charas et al. | 455/33.3 |
| 5,563,610 | 10/1996 | Reudink | 342/375 |

FOREIGN PATENT DOCUMENTS

| | | |
|---|---|---|
| 0593822 | 4/1994 | European Pat. Off. |
| 2221820 | 2/1990 | United Kingdom |

OTHER PUBLICATIONS

IEEE Transactions on Communictions Oct. 1972.
Lee et al, Polarization Diversity System for Mobile Radio, p. 913, Figs. 1–3.
William C.-Y. Lee et al., *Polarization Diversity System For Mobile Radio*, IEEE Transactions On Communications, vol. Com. 20, No. 5, Oct. 1972, pp. 912–923.
R. G. Vaughan et al., *Antenna Diversity For Mobile Communications*, Nordic Seminar On Digital Land Mobile Radiocommunication, Feb. 5–7, 1985, Espoo, Finland, pp. 87–96.

*Primary Examiner*—Reinhard J. Eisenzopf
*Assistant Examiner*—Lee Nguyen
*Attorney, Agent, or Firm*—Myers, Bigel, Sibley & Sajovec, L.L.P.

[57] ABSTRACT

A base station includes first and second antenna arrays for receiving first and second rotational polarizations, and a polarization diversity receiver connected to the first and second antenna arrays for processing respective first and second receive signals from a mobile station to generate an enhanced quality output receive signal based upon polarization diversity reception. Polarization isolation between the transmit and receive antenna elements may also provided by having a first plurality of transmit antenna elements for the second polarization mounted on a substrate carrying the first receive antenna elements. The second antenna array includes a second plurality of antenna elements of second polarization on a substrate carrying the second receive antenna elements. To achieve polarization diversity gain at the mobile station, the base station preferably further includes an alternating polarization transmitter for alternately transmitting signals at respective alternating first and second rotational polarizations. Method aspects of the invention are also disclosed.

54 Claims, 10 Drawing Sheets

OMNI-DIRECTIONAL   DIRECTIONAL (SECTOR)

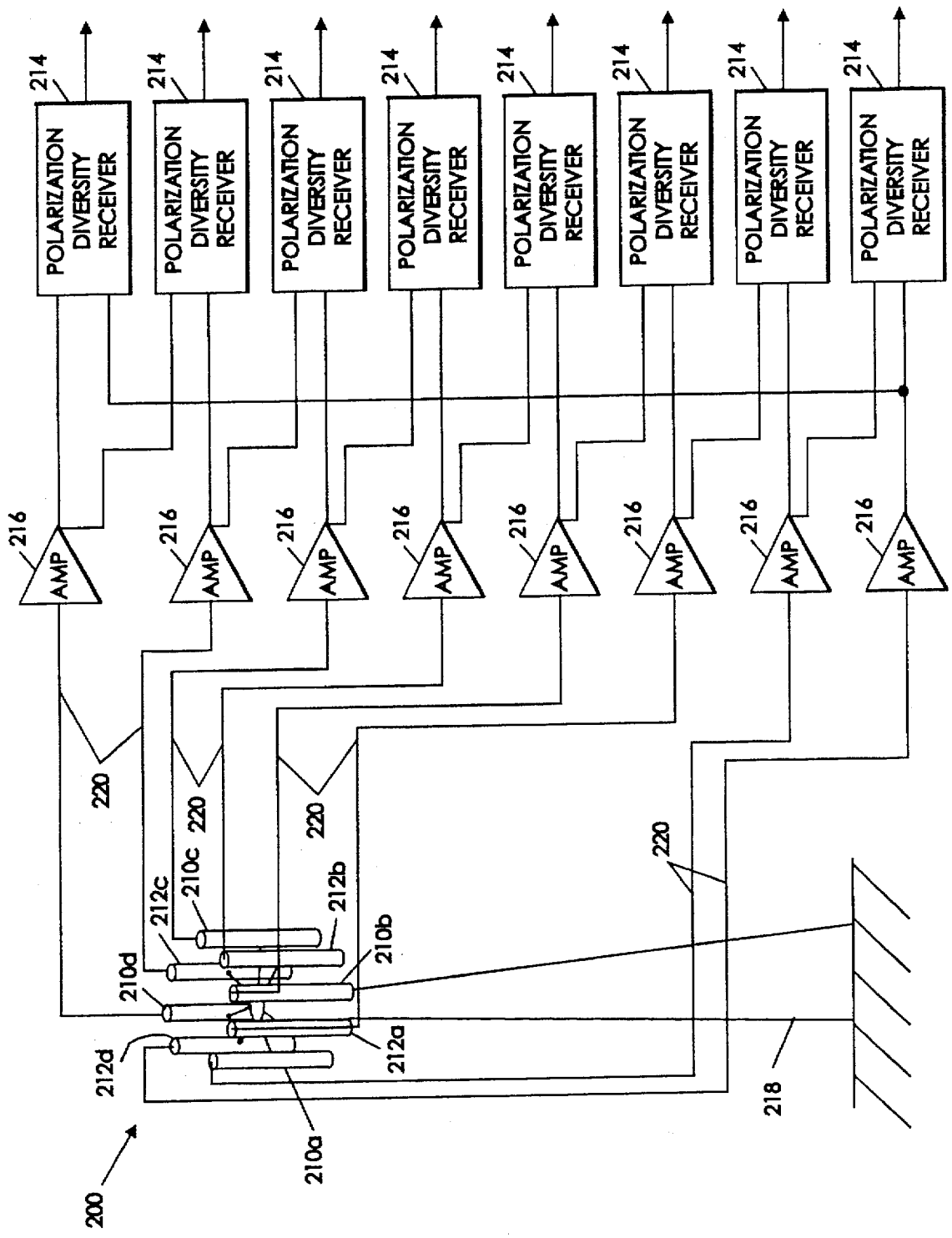

5,724,666

POLARIZATION DIVERSITY PHASED ARRAY CELLULAR BASE STATION AND ASSOCIATED METHODS

RELATED APPLICATION

The present application is a continuation-in-part of U.S. patent application Ser. No. 08/217,301 filed Mar. 24, 1994.

FIELD OF INVENTION

The present invention relates generally to communications systems and, more specifically, to a cellular radio communications system.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into 3 time slots.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station 21.

A typical base station 23 as in the prior art is schematically illustrated in FIG. 2 which shows, as an example, the functional components of model number RBS 882 manufactured by Ericsson Telecom AB, Stockholm, Sweden for the CMS 8800 cellular mobile telephone system. A full description of this analog cellular network is provided in publication number EN/LZT 101 908 R2B, published by Ericsson Telecom AB.

A now common sight along many highways, the base station 23 includes a control unit 34 and an antenna tower 35. The control unit 34 comprises the base station electronics and is usually positioned within a ruggedized enclosure at, or near, the base of the tower. Within this enclosure are the radio control group 37, or RCG, an exchange radio interface (ERI) 38 and a primary power supply 41 for converting electric power from the AC grid to power the individual components within the base station 23, and a backup power supply 42.

The ERI 38 provides signals between the MTSO 25 and the base station 23. The ERI 38 receives data from the RCG 37 and transfers it to the MTSO 25 on a dedicated MTSO-BS link 45. In the reverse direction, the ERI 38 receives data from the MTSO 25 and sends it the RCG 37 for subsequent transmission to a mobile station 21.

The radio control group 37 includes the electronic equipment necessary to effect radio communications. A functional block diagram of an RCG 37 as in the prior art is shown in FIG. 3. The configuration shown illustrates one control channel transmit/receive module (TRM) 51, a number of voice channel TRMs 52, and one signal strength receiver 53, as is a typical configuration required to serve one cell or sector of a cell. Each TRM 51, 52 includes a respective transmitter 54, receiver 55 and control unit 57. The TRMs 51, 52 are not typically frequency agile and operate instead on only one predetermined channel. Control signals from the ERI 38 are received by the individual control units 57. Voice and data traffic signals are routed over a separate interface to the ERI 38.

Each individual transmitter 54 for control and voice is connected to a transmit combiner 58. The transmit combiner combines all of the input signals onto a single output coupled through a coaxial cable 62 to the transmit antenna 63. Through the use of the combiner 58, up to 16 transmitters 54 can typically be connected to a common transmit antenna 63. The combiner 58 is used because there is often a premium for space on the masts and towers used to support the antennas. In an extreme case, one mast may be required to support over 100 radio channels.

On the receive side, each of two receive antennas 65 is coupled to a respective receive combiner 66A, 66B where the signals received are separated according to frequency and passed on to the individual receivers 55 in each of the TRMs 51, 52. The two receive antennas 65 are typically spaced 3 to 5 meters apart on the tower so that they may receive signals with uncorrelated fading patterns to thereby provide space diversity reception. There are many conventional techniques for both pre-detection and post-detection diversity which are described, for example, in Chapter 10 of the book entitled "Mobile Communications Engineering", by William C. Y. Lee, published by McGraw-Hill, 1992.

One visible feature of a typical base station 23 is the antenna tower 35. In order to achieve a reasonable coverage area, the antennas 63, 65 are desirably mounted at some distance above the ground. Referring now additionally to the prior art schematic plan view illustration of FIG. 4A, in rural areas the towers 35 are commonly located at the center of a cell 36 thereby providing omni-directional coverage. In an omni-directional cell, the control channel(s) and the active voice channel(s) are broadcast in all areas of the cell—usually from a single antenna. Where base stations 23 are more densely located, a sectorized antenna system may be employed as in the prior art, and shown by the schematic diagram of FIG. 4B. Sectorization requires directional antennas 70 having, for example, a 120 degree radiation pattern as illustrated in FIG. 4B. Each sector 71 is itself a cell having its own control channel(s) and traffic channel(s). Note that "channel" may refer to a specific carrier frequency in an analog system or to a specific carrier/slot combination in a hybrid TDMA/FDMA system, such as IS-54 and GSM.

FIG. 5A illustrates a typical antenna system as in the prior art and as discussed above. FIG. 5B illustrates two types of prior art antennas that have been heretofore discussed—an omni-directional antenna, such as a dipole 66, and a directional sector antenna 70 which further includes a reflector 64, for example. It being understood that transmit and receive antennas are typically of the same type for a given base station.

The use of scanning phased array antennas in cellular communications systems has been proposed. For example, Stapleton, et al., *A Cellular Base Phased Array Antenna System*, Proceedings of the 93rd IEEE VTC, pp. 93–96 describe a circular array of monopole radiating elements to provide 360 degree scanning capability. In order to provide space diversity, Stapleton's antenna is designed such that each radiating element has the potential of transmitting on every channel allocated to the cell.

It should be noted that passive microstrip arrays are also currently available for use with cellular base stations. For example, type no. 1309.41.0009 manufactured by Huber+Suhner AG of Herisau, Switzerland is a seven element linearly polarized flat panel passive antenna with a shaped elevation beam for use in cellular base stations. This array can replace the typical dipole antenna and is more suitable for locations on the sides of buildings or other flat surfaces. In application note 20.3, published by Huber+Shuner, it is shown that wide area coverage may be obtained via the use of power-splitters whereby portions of the signals are diverted to several individual panels.

Despite the theoretical advantages of space diversity in cellular system base station receiving antennas, sufficient separation may not always be obtainable. In other words, the antenna tower may not permit a sufficient physical separation of receive antennas to achieve uncorrelated fading for receive signals. In addition, the orientation of the linearly polarized mobile antenna may not always be in alignment with the typically vertically polarized receive antenna at the base station. In addition, reception at the mobile station may also be subject to fading.

SUMMARY OF THE INVENTION

In view of the foregoing background, it is therefore an object of the present invention to provide a cellular communications system base station capable of providing enhanced communication with a mobile station, particularly in view of fading and/or misorientation of the mobile antenna.

This and other objects, advantages and features of the present invention are provided by a base station comprising first and second antenna arrays for receiving first and second polarizations, and a polarization diversity receiver connected to the first and second antenna arrays for processing respective first and second receive signals from a mobile station to generate an enhanced quality output receive signal based upon polarization diversity reception. More particularly, the first antenna array includes a first plurality of receive antenna elements for preferably receiving signals having a first polarization and being arranged in a predetermined pattern to define a first receive coverage area. Similarly, the second antenna array preferably comprises a second plurality of receive antenna elements for receiving signals having a second polarization different from the first polarization and being arranged in a predetermined pattern to define a second receive coverage area. Antenna mounting means is preferably provided for mounting the first and second antenna arrays so that the first and second receive coverage areas are overlapping. The mounting means preferably comprises an antenna mast. Alternately, the mounting means may comprise another supporting structure such as a wall of a building, for example.

The polarizations may be rotational polarizations. For example, the first polarization may be right-hand-circular polarization, and the second polarization may be left-hand-circular polarization. The mobile station antenna typically has a linear polarization, but may be oriented at angles between horizontal and vertical. Accordingly, polarization diversity provides an enhanced receive signal that is less subject to fading.

The polarization diversity receiver preferably comprises signal quality determining means for determining signal-to-noise ratios of the first and second receive signals, and weighting means for weighting the first and second receive signals based upon the respective signal-to-noise ratios thereof to thereby generate the enhanced quality output receive signal. The polarization diversity receiver preferably further includes means for separating the first and second receive signals into a plurality of respective individual channels based upon frequency or time slot and for processing each of the individual channels to generate a respective enhanced quality output receive signal based upon polarization diversity reception.

Polarization isolation between the transmit and receive antenna elements is also provided according to the invention. Accordingly, the first antenna array preferably further includes a first plurality of transmit antenna elements arranged in a predetermined pattern for transmitting the second rotational polarization to thereby provide polarization isolation from the first plurality of receive antenna elements. Similarly, the second antenna array preferably comprises a second plurality of transmit antenna elements arranged in a predetermined pattern for transmitting the first rotational polarization to thereby provide polarization isolation from the second receive antenna elements. In addition, a respective one of the receive antenna elements of the first antenna array and a respective one of the transmit antenna elements of the first antenna array may be provided on a common patch antenna. The common patch antenna is capable of receiving signals having one polarization while transmitting signals having another polarization.

Another aspect of the present invention is that polarization diversity may be achieved on transmission from the base station so that a polarization diversity gain is achieved at the mobile station. The polarization diversity on transmission may be used independently of or in combination with the polarization diversity on receive. To achieve polarization diversity gain at the mobile station, the base station preferably further includes alternating polarization transmitter means connected to the first and second pluralities of transmitter antenna elements for alternately transmitting signals at respective alternating first and second rotational polarizations. The base station also preferably includes transmitter coding means connected to the alternating polarization transmitter means for generating coded and interleaved time division multiple access signals transmitted from the first and second antenna arrays to the mobile station. Accordingly, a mobile station for communicating with the cellular base station transmitting the interleaved coded signals at respective alternating first and second rotational polarizations preferably includes an antenna for receiving signals transmitted from the cellular base station, and receiver means connected to the antenna for deinterleaving and decoding the signals from the cellular base station to thereby achieve polarization diversity gain. The interleaved coded signal transmitted from the cellular base station is preferably a time division multiple access (TDMA) signal, and wherein the receiver means includes means for receiving the TDMA signal.

The first antenna array preferably comprises an elongate substrate carrying the first plurality of receive antenna elements and the first plurality of transmit antenna elements extending in a vertical direction. The second antenna array is similar and is mounted adjacent to the first antenna array. Each of the first and second antenna arrays preferably further comprises a plurality of transmit amplifiers on the elongate substrate and connected to respective transmit antenna elements to thereby define an active phased array antenna. For environmental protection, each of the first and second antenna arrays preferably further comprises a radio-transparent housing surrounding the elongate substrate.

A method aspect of the present invention is for operating a cellular base station for communicating with at least one mobile station. The method preferably comprises the steps of: receiving a first signal from a mobile station at a first polarization; receiving a second signal from the mobile station at a polarization different from the first polarization; and processing the first and second receive signals to generate an enhanced quality output receive signal based upon polarization diversity reception.

Another method aspect of the present invention is for obtaining polarization isolation while also obtaining diversity gain at the mobile station. The method preferably comprises the steps of: transmitting the second polarization from adjacent the first plurality of receive antenna elements to thereby provide polarization isolation; and transmitting the first polarization from adjacent the second plurality of receive antenna elements to thereby provide polarization isolation. The method also preferably includes the step of alternately transmitting signals at respective alternating first and second polarizations to provide enhanced received signal quality at a mobile station.

BRIEF DESCRIPTION OF THE DRAWINGS

These and other features and advantages of the present invention will be readily apparent to one of ordinary skill in the art from the following written description, read in conjunction with the drawings, in which:

FIG. 6 is a plan view of a base station including a plurality of antenna elements according to the present invention;

DETAILED DESCRIPTION OF THE PREFERRED EMBODIMENTS

Figure 1:
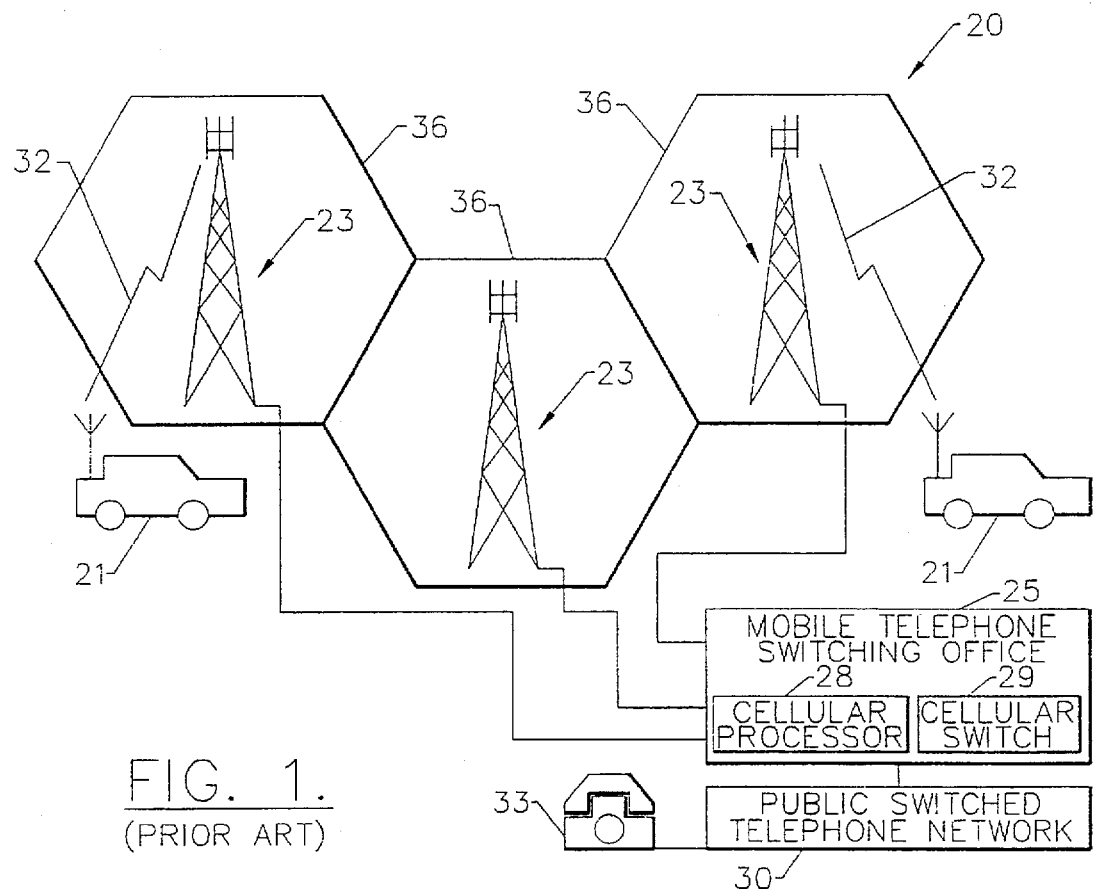
FIG. 1 is a schematic block diagram illustrating the basic components of a cellular communications system as in the prior art.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring first to FIG. 6, a base station 200 including a plurality of antenna arrays is described. The antenna arrays are arranged in a cylindrical pattern to provide the possibility to transmit or receive in any direction. Alternating first 210a–d and second 212a–d antenna arrays are for receiving signals having first and second polarizations. A polarization diversity receiver 214 is connected to each of the first 210 and second 212 antenna arrays for processing respective first and second receive signals received from a mobile station to generate an enhanced quality output receive signal based upon polarization diversity reception. Furthermore, the signal from each of the antenna arrays 210a–d and 212a–d can be amplified by a respective amplifier 216 before being applied to a respective polarization diversity receiver 214. As shown, each polarization diversity receiver receives signals from two adjacent antenna arrays. As will be understood by those having skill in the art, a higher degree of polarization diversity reception can be achieved by providing signals from more than two adjacent antenna arrays to each polarization diversity receiver.

Figure 7:
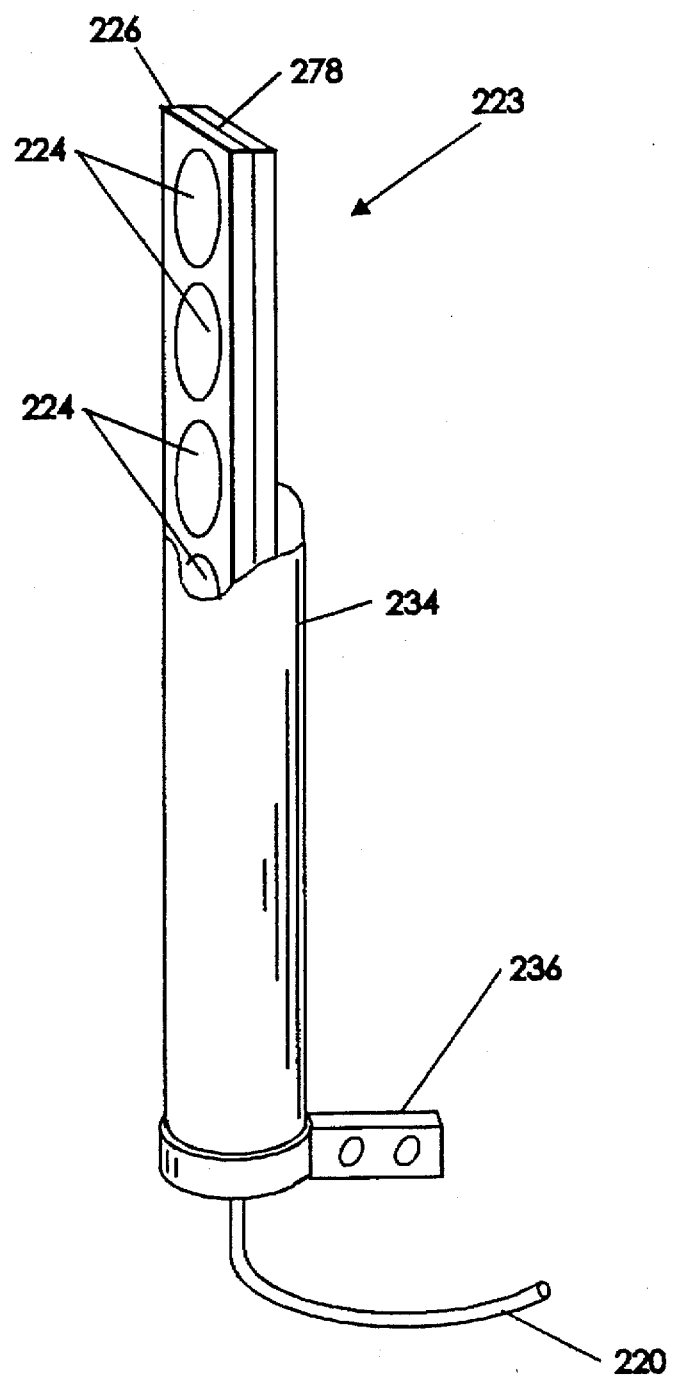
FIG. 7 is a cut away view of an antenna array including a plurality of patch antenna elements on an elongate substrate according to FIG. 6.
Figure 8:
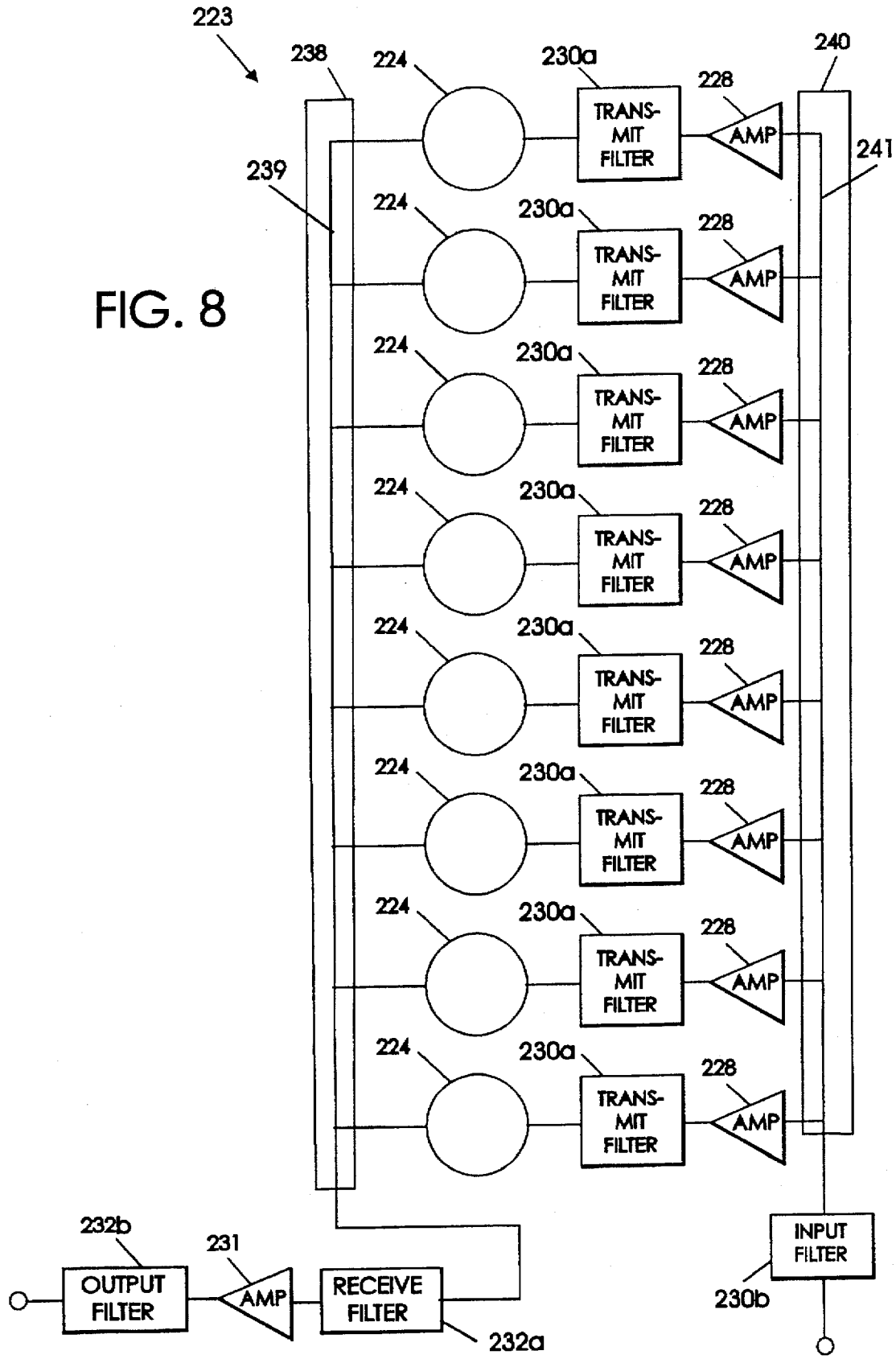
FIG. 8 is a schematic view of an antenna array according to FIG. 7.

More particularly, each of the first antenna arrays 210a–d preferably includes a first plurality of receive antenna elements for receiving signals having a first rotational polarization and being arranged in a predetermined pattern to define a first receive coverage area. The antenna elements may be circular patch antenna elements (as illustrated in FIGS. 7 and 8) or crossed dipoles as would be readily understood by those skilled in the art. In addition, these antenna elements may serve simultaneously as transmit antenna elements.

Similarly, each of the second antenna arrays 212a–d preferably comprises a second plurality of receive antenna elements (as illustrated in FIGS. 7 and 8) for receiving a second rotational polarization different from the first rotational polarization and being arranged in a predetermined pattern to define a second receive coverage area. Again, these antenna elements may serve simultaneously as transmit antenna elements. Antenna mounting means, such as the illustrated antenna mast 218, is preferably provided for mounting the first and second antenna arrays so that the adjacent receive coverage areas defined by adjacent antenna elements are overlapping.

A cut away of a single antenna array 223 is illustrated in FIG. 7. In a preferred embodiment, the antenna array includes a plurality of printed circuit board antenna elements 224, such as patch antennas. The antenna elements 224, such as patch antenna elements, are provided on an elongate substrate 226 such as a printed circuit board, and these patch antennas can be used as transmit and receive elements simultaneously. The elongate substrate may also be provided with other components such as input amplifiers 228, input 230b or transmit 230a filters, an output or receive low noise amplifier ("LNA") 231, and an output 232b or receive 232afilter, as illustrated schematically in FIG. 8. As further illustrated in FIG. 7, the elongate substrate 226 with patch antennas 224 is preferably enclosed in a radio-transparent tubular housing 234. A mounting bracket 236 can be used to connect the antenna array to the base station mast, and the cable 220 can be used to connect the antenna array 223 to respective polarization diversity receivers.

As shown schematically in FIG. 8, each antenna element 224 is coupled by first coupling circuit 238 including first coupling line 239 to a common receive filter 232aand low-noise receive amplifier 231. Second coupling circuit 240 including coupling line 241 distributes a transmit signal to the transmit power amplifiers 228. As would be readily understood by those skilled in the art, the transmit amplifiers may be either single carrier power amplifiers (SCPA's) for amplifying a Time Division Multiple Access (TDMA) signal, or multi-carrier power amplifier's (MCPA's) for amplifying a composite of several different carrier frequency signals. In the case that SCPA's are used, a signal is directed towards a single principle direction on a single frequency, while if MCPA's are used, multiple signals on different frequencies can be directed in each direction. In the receive direction, however, the receive low noise amplifier 231 is preferably always capable of receiving and amplifying signals on multiple frequencies. In addition to coupling line 240, the second coupling circuit may include switching means for dynamically partitioning the transmit array to provide transmit subarrays operating on different frequencies in the same time slot.

The transmit amplifiers 228 may produce wideband noise outputs at frequencies overlapping the receive frequency band and be of sufficient level to degrade the noise figure of the receive low noise amplifier 231. Accordingly, transmit 230a and receive 232afilters can be used as illustrated. The receive filter 232amay be a bandpass filter tuned to pass the receive frequency band and attenuate transmit frequency signals, while the transmit filters 230a or input filter 230b can be notch filters to attenuate transmission in the receive frequency band and pass the transmit frequency band.

As would be readily understood by those skilled in the art, directivity favoring reception is one way to improve received signal quality. Another way to improve the received signal quality is diversity reception using two or more preferably independent channels, for example, on widely spaced antennas (space diversity), different frequencies (frequency diversity) or at different times (time diversity or interleaved repeat coding). Considerable diversity gain is available when combining signals from sources suffering from uncorrelated fading in a joint signal processor, as distinct from just combining signals from different antenna array elements to obtain directive gain.

Typically combining signals from two different antennas experiencing the same signal fading will yield a gain of approximately 3dB while if the fading is uncorrelated Rayleigh, gains on the order of 7dB may be obtained. Fading can be uncorrelated on two antennas spaced only inches apart on a mobile phone, but unfortunately, due to a geometric magnification effect, the spacing required at a base station can be hundreds of times greater. Relatively close spacing is possible at the mobile station because the multiple paths that cause fading tend to arise due to near field clutter in the vicinity of the mobile station, such as due to reflections from objects within a few tens or hundreds of yards. In the reverse direction, however, these reflections may propagate several miles to the base station causing the geometric magnification of the antenna spacing required at the base station. Accordingly, a spacing of several feet between adjacent antennas at the base station may be insufficient to obtain uncorrelated fading through space diversity.

On the other hand, it is observed that fading is largely uncorrelated when comparing antennas of orthogonal polarizations. Accordingly, the alternate antenna arrays according to the invention are preferably orthogonally polarized. For example, each of the first antenna arrays 210 may use orthogonal rotational polarizations such as right-hand-circular-polarization (RHCP) for transmitting and left-hand-circular-polarization (LHCP) for receiving, while each of the second adjacent antenna arrays 212 may use the opposite polarizations for transmitting and receiving. Accordingly, polarization isolation can be used in a preferred embodiment to isolate the transmit and receive signals. The receive paths preferably have multi-carrier capability even if the transmitting paths have only single-carrier capability. Therefore, the received signals are received with both RHCP and LHCP which exhibit uncorrelated fading. Upon processing the signals from two or more antenna arrays, a diversity gain is obtained which is greater than the directive gain that would have been obtained had all antenna arrays had like receive polarization.

Figure 9:
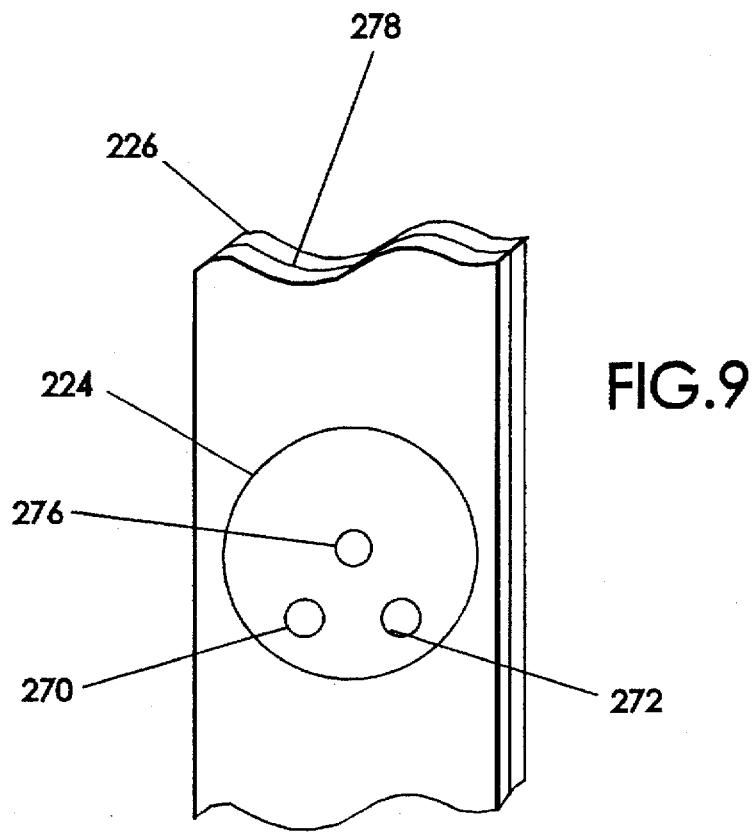
FIG. 9 is a front perspective view of a single patch antenna element on an elongate substrate (fixed) according to FIG. 7.
Figure 10:
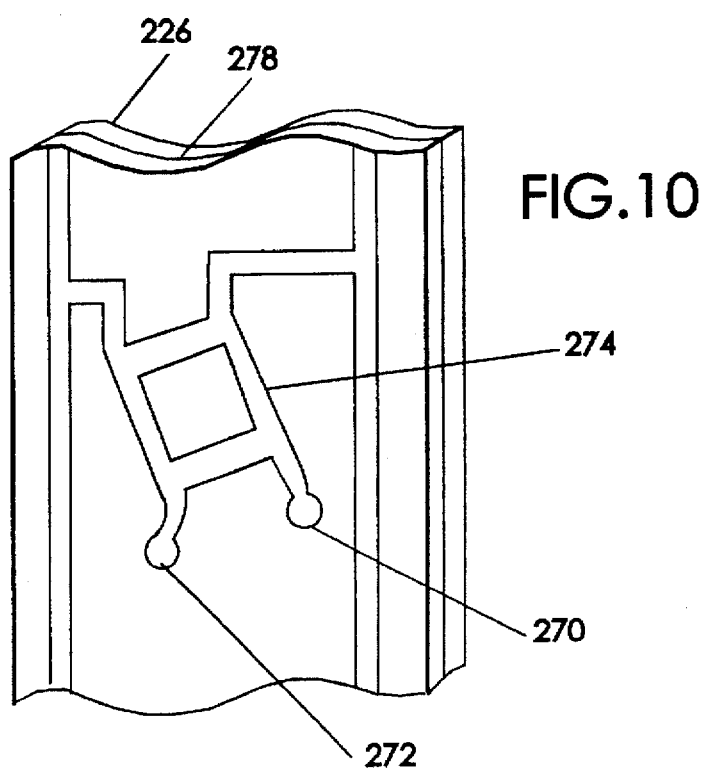
FIG. 10 is a back perspective view of a single patch antenna element on an elongate substrate according to FIG. 7.

As will be understood by those having skill in the art with reference to FIG. 7, each antenna array is preferably fabricated separately on an elongate substrate 226 such as a long thin module or printed circuit board. Printed circuit board antenna elements, such as patch antennas, may be readily fabricated as part of such a module as would be readily understood by those skilled in the art. As shown in FIGS. 9 and 10, a circular patch antenna element 224 may be fed at two feed points 270 and 272, and the two feed points connected to a printed, branch-line quadrature coupler 274 to provide two feed points 270 and 272 of opposite circular or rotational polarization. A ground connection 276 can be used to connect the antenna element 224 to a ground plane 278 shown sandwiched between two layers of the elongate substrate 226. As will be understood by those having skill in the art, active elements, such as amplifiers, and passive elements, such as filters, may also be mounted or constructed on the elongate substrate.

As illustrated in FIG. 7, each antenna array preferably includes a radio-transparent tubular housing 234 surrounding the elongate substrate 226. For cold climates, a temperature sensor and heater may be included within the housing.

Several collinear antenna arrays may be mounted on a single antenna mount. Each antenna array thereby provides directivity in the azimuthal plane as well as a narrow beam in the vertical plane, and the arrays may be oriented to cover different azimuthal sectors. This can be done by mounting different collinear arrays around the antenna mast at the same height but pointing to different azimuthal sectors, or by mounting two or more arrays above each other pointing to the same or different azimuthal sectors. In fact, the azimuthal pointing of an array may be set independently of where it is mounted, but it is preferred that the arrays be directed so that there is no interference from the other antenna arrays or the mast.

The base station 200 preferably includes a plurality of antenna arrays 210a–d and 212a–d arranged in a circular pattern, as shown in FIG. 6. Signals received from each antenna array are transmitted over respective cables 220 to respective amplifiers 216 before being applied to respective polarization diversity receivers 214. In a preferred embodiment, cable loss is reduced by integrating masthead preamplifiers into the antenna assembly of FIG. 7. The masthead preamplifiers provide gains ahead of the respective cables 220. As will be understood by those having skill in the art, the distribution function of amplifiers 211 can alternately be accomplished by means of a passive splitter. Received signals from two adjacent antenna arrays are applied to each polarization diversity receiver, as shown. Accordingly, signals which are received by adjacent antenna arrays can be enhanced by the respective polarization diversity receiver thereby reducing the effect of signal fading.

Figure 11:
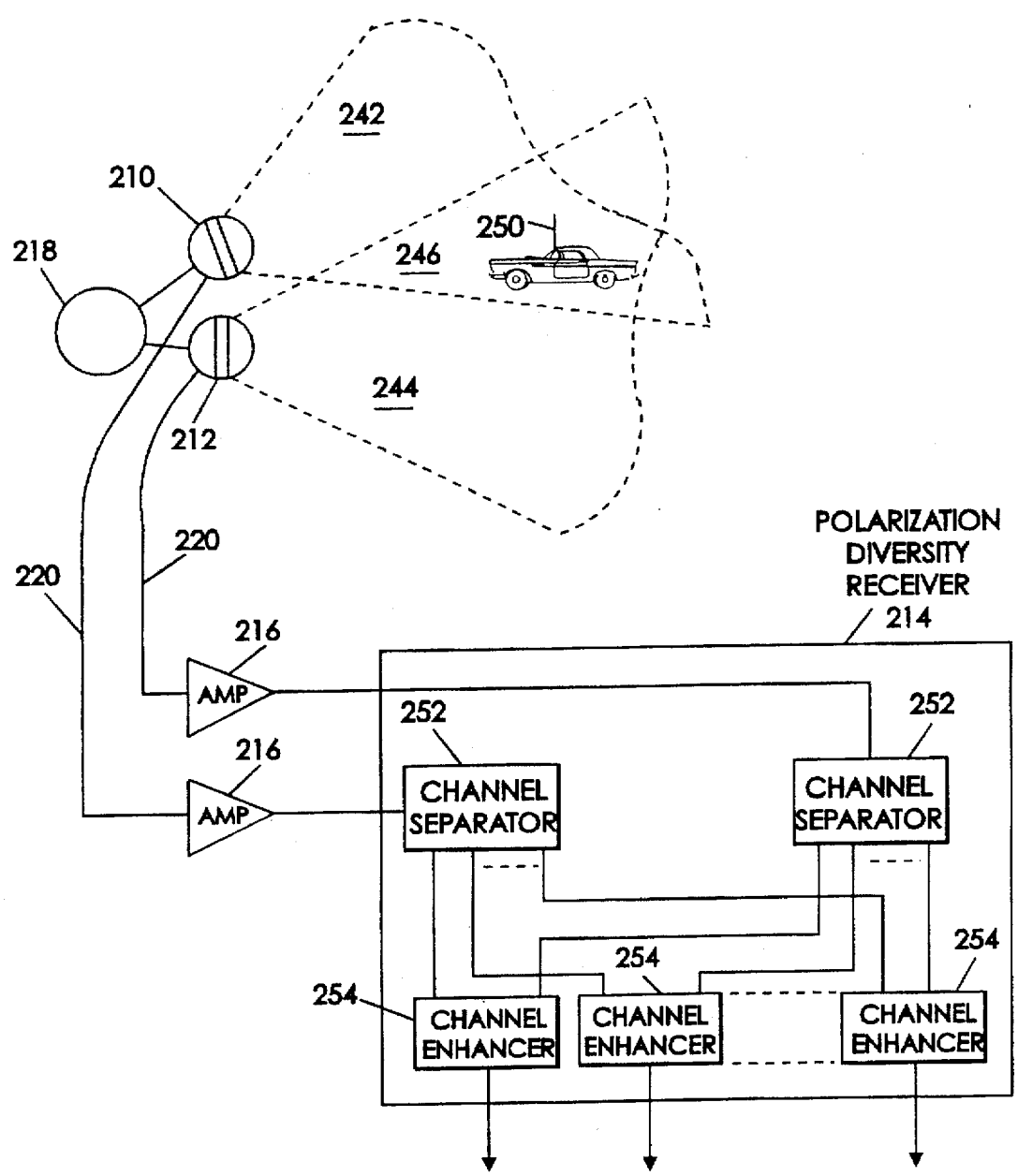
FIG. 11 is a top view of a pair of antenna element arrays defining respective receive coverage areas according to FIG. 6.

A pair of adjacent antenna arrays 210 and 212 each define respective receive coverage areas 242 and 244, as illustrated in FIG. 11. The antenna arrays are mounted on the mast 218 so that the receive coverage areas 242 and 244 define an overlap area 246. Accordingly, a mobile station 248, such as a cellular radiotelephone 250 in an automobile, located in the overlap area 246 can transmit signals which are received by both antenna arrays 210 and 212.

Where an overlap area includes receive coverage areas from two antenna arrays which both receive signals having orthogonal polarizations from a mobile station in the overlap area, this is known as dual polarization diversity. As will be understood by those having skill in the art, higher levels of polarization diversity may also be achieved in the context of the present invention. For example, triple polarization diversity may be used wherein an overlap area includes coverage areas from three antenna arrays, and a triple polarization diversity receiver is used to combine the signals received by the three antenna arrays. In addition, higher levels of polarization diversity can be used for transmission.

As previously discussed, the first antenna array 210 preferably receives signals having a first rotational polarization and the second antenna array 212 receives signals having a second rotational polarization. Accordingly, the first antenna array 210 generates a received signal in response to a portion of the signal transmitted by the cellular radiotelephone having the first rotational polarization. In contrast, the second antenna array 212 generates a second received signal in response to a portion of the signal transmitted by the cellular radiotelephone having the second rotational polarization. This polarization diversity between the received signals of antenna arrays 210 and 212 allows the operation of the polarization diversity receiver 214.

Alternately, both polarizations can be received on each antenna array, either by constructing receive only arrays or by using duplexing filters in place of transmit filters 230a. In this case, a first receive signal having a polarization orthogonal with respect to the transmit signal is fed to the amplifier 231, as before. In addition, a second received signal is separated from the transmit path, wherein the second received signal has the same polarization as the transmitted signal. A separate amplifier, similar to amplifier 231 can be added for this extra receive path, and both polarizations of received signals from one or more antenna arrays can be fed to a multiple diversity receiver 214.

The polarization diversity receiver 214 preferably includes means, such as channel separators 252, for separating the first and second receive signals into a plurality of respective individual channels based upon frequency and/or time slot and for processing each of the individual channels to generate a respective enhanced quality output receive signal based upon polarization diversity reception.

The polarization diversity receiver also preferably includes a channel enhancer 254 for processing each pair of associated signals for each channel generated by the channel separators 252. If only one channel is received by the plurality of antenna arrays, the channel separators 252 can be eliminated, and a single channel enhancer 254 can be used.

The channel enhancers 254 preferably include signal quality determining means for determining signal-to-noise ratios of the first and second receive signals, and weighting means for weighting the first and second receive signals based upon the respective signal-to-noise ratios thereof to thereby generate the enhanced quality output receive signal. The determination of signal-to-noise ratios and weighted processing of diverse receive signals is disclosed in U.S. Pat. No. 5,191,598 to Backstrom et al., the entire disclosure of which is incorporated herein by reference. In addition, patent application Ser. No. 08/251,202 entitled "Diversity Receiver for Signals With Multipath Time Dispersion" to Bottomley and filed May 21, 1994 discloses an alternate diversity receiver technique. This application is hereby incorporated herein by reference.

Each active antenna array 223 includes a plurality of RF power transmit amplifiers 228 each coupled through a transmit filter 230a to an individual radiating transmit antenna element 224, as shown in FIG. 8. The antenna elements 224 are preferably used to both transmit and receive simultaneously. Power is distributed to each power amplifier 228 via a power dividing network such as coupling circuit 240. In this embodiment, the above-mentioned components are preferably fabricated using stripline or microstrip techniques on a mounting substrate, such as a glass-epoxy printed circuit board, as would be readily understood by those skilled in the art. Dividing means, such as coupling circuit 240, can include a plurality of inputs and switching means to select which input signals are distributed to which amplifiers 228. The switching means can be activated by pre-programmed control means to determine for each time slot if the full array is used at one transmit frequency or if transmit subarrays are formed for transmitting multiple frequencies simultaneously.

The coupling circuit 240 is a network for distributing RF power from a single input to several outputs and may preferably be a Wilkinson power divider, branch-guide or edge-coupled divider, or other well-known power division device, such as described in Chapter 5 of Bahl, et al., *Microwave Solid State Circuit Design*, Wiley & Sons, 1988. The coupling circuit 240 is preferably designed to provide phase coherent outputs to each power transmit amplifier 228. The input power may be equally divided and in-phase among all of the power amplifier 228 inputs; this is known as uniform illumination and produces a symmetrical radiation pattern. Alternatively, small power imbalances and/or phase offsets can be provided if it is desired to shape the radiation pattern in accordance with basic array theory. A discussion of phase offsets and power imbalances may be found in Part 2 of Brookner, *Practical Phased-Array Antenna Systems*, Artech House, 1991. Another reference on the basics of array theory can be found in Chapter 7 of Skolnik, *Radar Handbook* 2nd Ed., McGraw Hill, 1990. Alternately, the switch-selected distribution arrangement of coupling circuit 240 can employ an active integrated circuit microwave switch chip.

The output of each filter 230a is illustratively coupled to a respective radiating transmit antenna element 224 which may also operate simultaneously as a receive antenna element. This antenna element may preferably be a linearly-polarized microstrip patch antenna such as described on pages 7-1 to 7-14 of Johnson, et al., *Antenna Engineering Handbook*—2nd Edition, McGraw-Hill, 1984. Alternatively, a circularly polarized patch antenna, such as described on pages 7-14 to 7-16 of the aforementioned reference may equivalently be used.

In the illustrated embodiment of the base station 200, the antenna arrays 210a–d and 212a–d are preferably identical. Each antenna array is preferably formed from microstrip patch elements 224, and constructed from a glass-epoxy circuit board using stripline or microstrip techniques, as would be readily understood by those skilled in the art. The antenna elements 224 are again preferably microstrip patch radiators as described above. The patch antenna elements 224 are preferably rotationally polarized patch antenna elements. It is preferred that adjacent antenna arrays have opposite rotational polarizations—left hand circular polarization and right hand circular polarization.

The receive antenna elements 214 are coupled to a common output via a combining network such as coupling circuit 238. Basically the inverse of the power dividing network, the combining network coherently couples the signals received from array elements 214 into a common output. As before, the combining network may introduce phase offsets or tapered coupling in order to effect beam shaping or to reduce vertical sidelobes, and to reduce unwanted deep nulls to mobiles very close to the mast.

The output of combining network is illustratively coupled to a receive filter 232a and a low-noise amplifier (LNA) 231. Traditionally, a similar LNA was located in the RCG of a conventional base station, and, accordingly, the received signal suffered 2–4 dB of transmission loss through the IFL cabling. By locating the LNA 231 on the receive antenna array 223 in accordance with another advantage of the present invention, losses prior to amplification are reduced thereby benefitting the overall system noise figure and allowing an increase in site/cell radius or a reduction in mobile power output to increase battery life.

The amplified receive signal from the LNA 231 is also preferably filtered to remove unwanted signal components, such as those generated by the power transmit amplifiers 228 that are not always removed by receive filter 232a. Therefore the output of LNA 231 is preferably coupled to a bandpass filter such as output filter 232b. The bandpass filter may be a microstrip edge coupled filter, such as described in Chapter 6 of Bahl, et al., *Microwave Solid State Circuit Design*, Wiley & Sons, 1988, a high-k ceramic resonator filter, or a SAW filter. Depending on the system bandwidth and transmit/receive duplex spacing, a low-pass, or high-pass filter may also be acceptable as would be readily understood by those skilled in the art.

Both the transmit signals and the receive signals are coupled to/from the antenna array 223 via a cable 220 such as an interfacility link (IFL). In the illustrated embodiment, the IFL preferably comprises a bundle of coaxial cables, and power cables to provide power to the power transmit amplifiers 228 and the LNA 231.

The invention also includes a method for operating a cellular base station which communicates with at least one mobile station as shown in FIG. 11. The base station receives a first signal from the mobile station 250 at a first polarization, and receives a second signal from the mobile station 250 at a polarization different from the first polarization. Preferably, the base station includes two antenna arrays 210 and 212 both positioned to receive signals from the overlap region 246. Accordingly one antenna array receives the signals having the first polarization, and the other antenna array receives the signals having the second polarization. The base station then processes the first and second receive signals to generate an enhanced quality output receive signal based upon polarization diversity reception.

Antenna azimuthal radiation patterns similar to conventional 120° sector patterns can be used such that considerable overlaps of adjacent coverage areas of adjacent antenna arrays is deliberately arranged. The polarization diversity receiver processing can alternately be viewed as adaptive array processing, and can be designed either to increase desired signal reception, reduce interference, or to increase signal-to-interference ratios as described in U.S. patent application Ser. No. 08/284,775 entitled "Interference Rejection Combining" to Bottomley. This patent application was filed on Aug. 2, 1994, and is hereby incorporated herein by reference.

The first and second receive signals are preferably processed by the diversity receiver 214. The processing step preferably comprises determining signal-to-noise ratios of the first and second receive signals, and weighing the first and second receive signals based upon the respective signal-to-noise ratios thereof to generate the enhanced quality output receive signal. In addition, the first and second receive signals can be separated into a plurality of respective individual channels based upon frequency and each of the individual channels can be processed to generate a respective enhanced quality output receive signal based upon polarization diversity reception. The step of receiving the first signal may include receiving same via a first plurality of receive antenna elements forming antenna array 210 and arranged in a predetermined pattern. The step of receiving the second signal may include receiving same via a second plurality of receive antenna elements forming antenna array 212 and arranged in a predetermined pattern.

This method may also include the step of transmitting the second polarization from adjacent the first receive antenna 210 array, and transmitting the first polarization from adjacent the second receive antenna array 212, to thereby provide polarization isolation. In fact, the first antenna array 210 can receive signals having the first polarization while transmitting the second polarization, and the second antenna array 212 can receive signals having the second rotational polarization while transmitting signals having the first polarization. Accordingly, the diversity receiver 214 of FIG. 11 and the transmit signal coder 282 of FIG. 12 can be implemented in a single base station.

Figure 12:
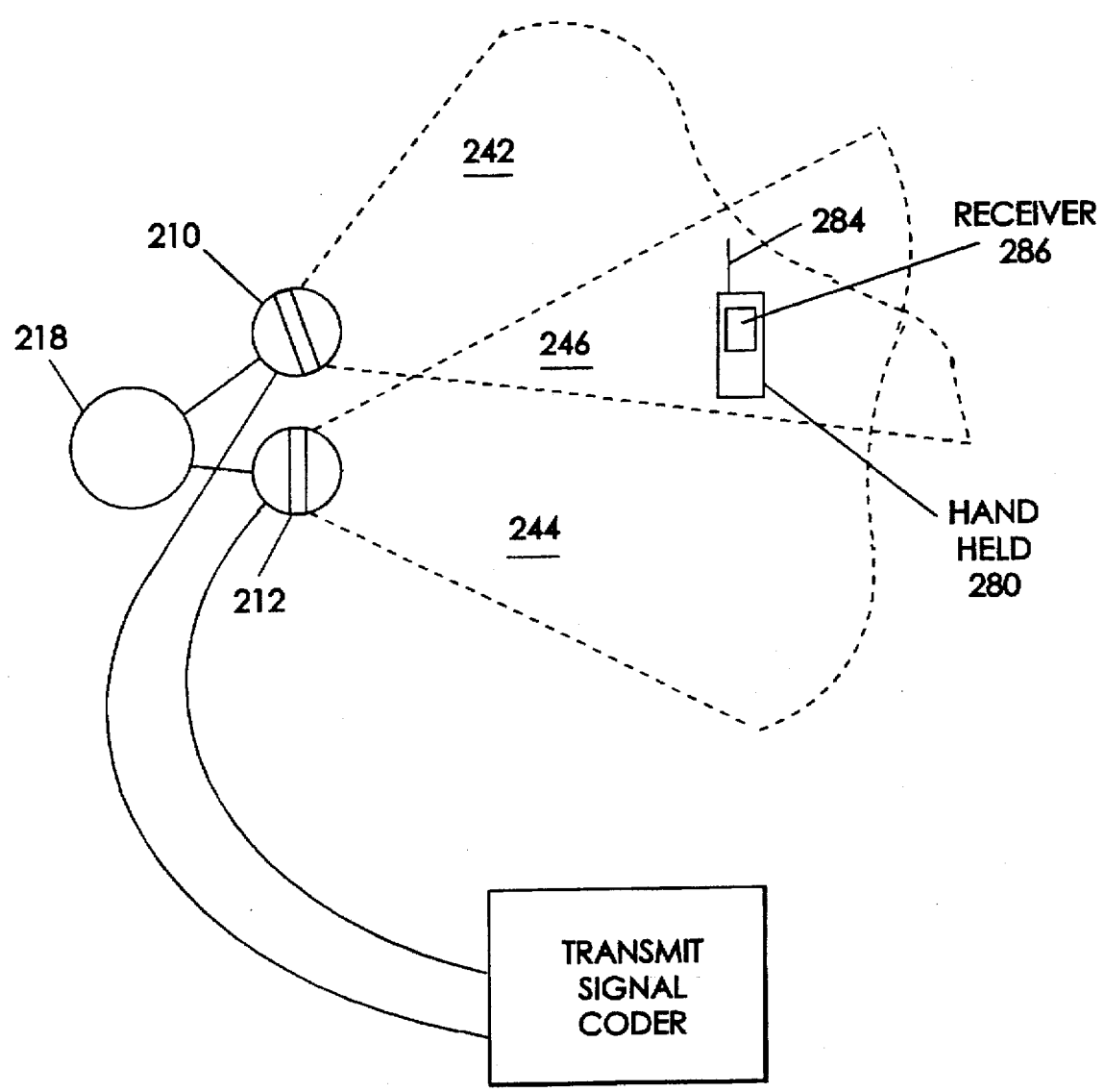
FIG. 12 is a top view of a pair of antenna element arrays defining respective transmit coverage areas according to FIG. 6.

The signals can be alternately transmitted from the base station at respective alternating first and second polarizations to provide enhanced received signal quality at a mobile station. The signals transmitted from the base station to the mobile station can be coded and interleaved time division multiple access signals. In addition, the step of receiving the first rotational polarization can include receiving right-hand-circular polarization, and the step of receiving the second rotational polarization can include receiving left-hand-circular polarization.

Where two antenna arrays 210 and 212 cover the same area or are oriented to give significant overlap, as shown in FIG. 12, each antenna array 210 and 212 can simultaneously cover a mobile station 280, such as a cellular radiotelephone, in the overlap area 246. By transmitting successive signal segments (e.g. TDMA frames) using alternatingly one then the other antenna array having different polarizations, the fading of the of the signal received at the mobile station can be made substantially uncorrelated in successive segments. Accordingly, polarization diversity gain can be achieved when transmitting from the base station to the mobile station.

The transmission to the mobile station can therefor employ interleaving of coded data over successive segments such that the decoded signal comprises bits taken alternately from successive segments that may be received with relatively high and low quality. In this manner, the average bit quality into the decoder is not all high quality or low quality but adequate to ensure a high probability of error free decoding. This technique is especially useful for communication with static or walking speed hand held phones that may suffer from slow signal fading. The polarization alternation effectively converts slow fading into faster fading that is more effectively averaged by the coding and interleaving.

As shown in FIG. 12, the base station includes two adjacent antenna arrays 210 and 212 for transmitting over respective adjacent coverage areas 242 and 244. The antenna arrays are arranged so that the respective coverage areas define an overlap area 246. Accordingly a mobile station 280, such as a hand held cellular radiotelephone, in the overlap area 246 can receive signals transmitted by both antenna arrays 210 and 212.

The base station also includes a transmit signal coder 282 for processing the signal to be transmitted to the mobile station 280 in the overlap area 246. The transmit signal coder produces a transmit signal that is interleaved and coded at respective alternating first and second rotational polarizations. Preferably, the portions of the signal having the first rotational polarization are consistently applied to one of the antenna arrays, and the portions of the signal having the second rotational polarization are applied to the other antenna array.

Figure 2:
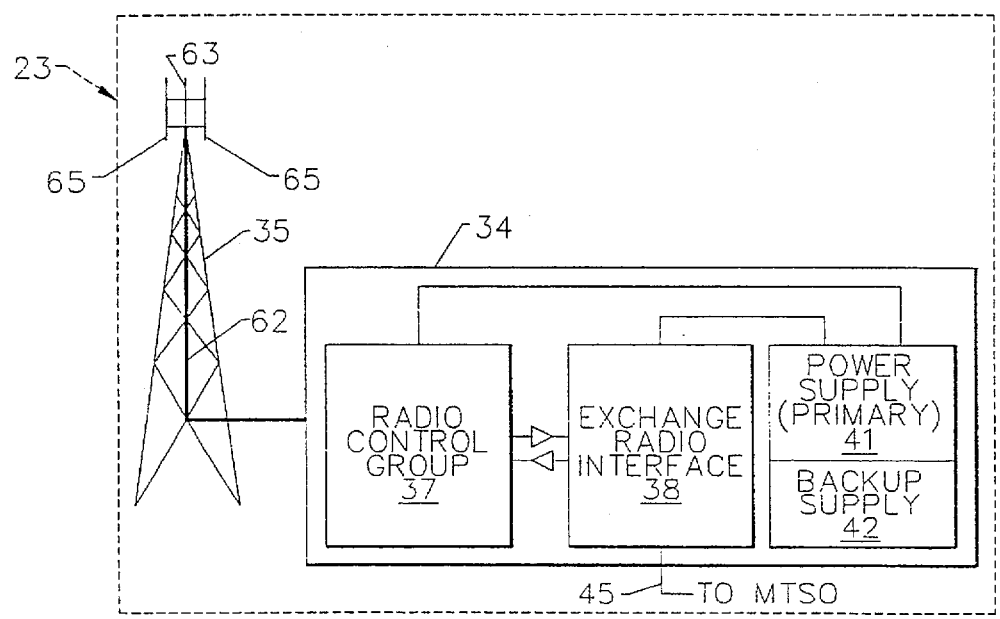
FIG. 2 is a schematic block diagram illustrating the functional components of a cellular communications base station as in the prior art.
Figure 3:
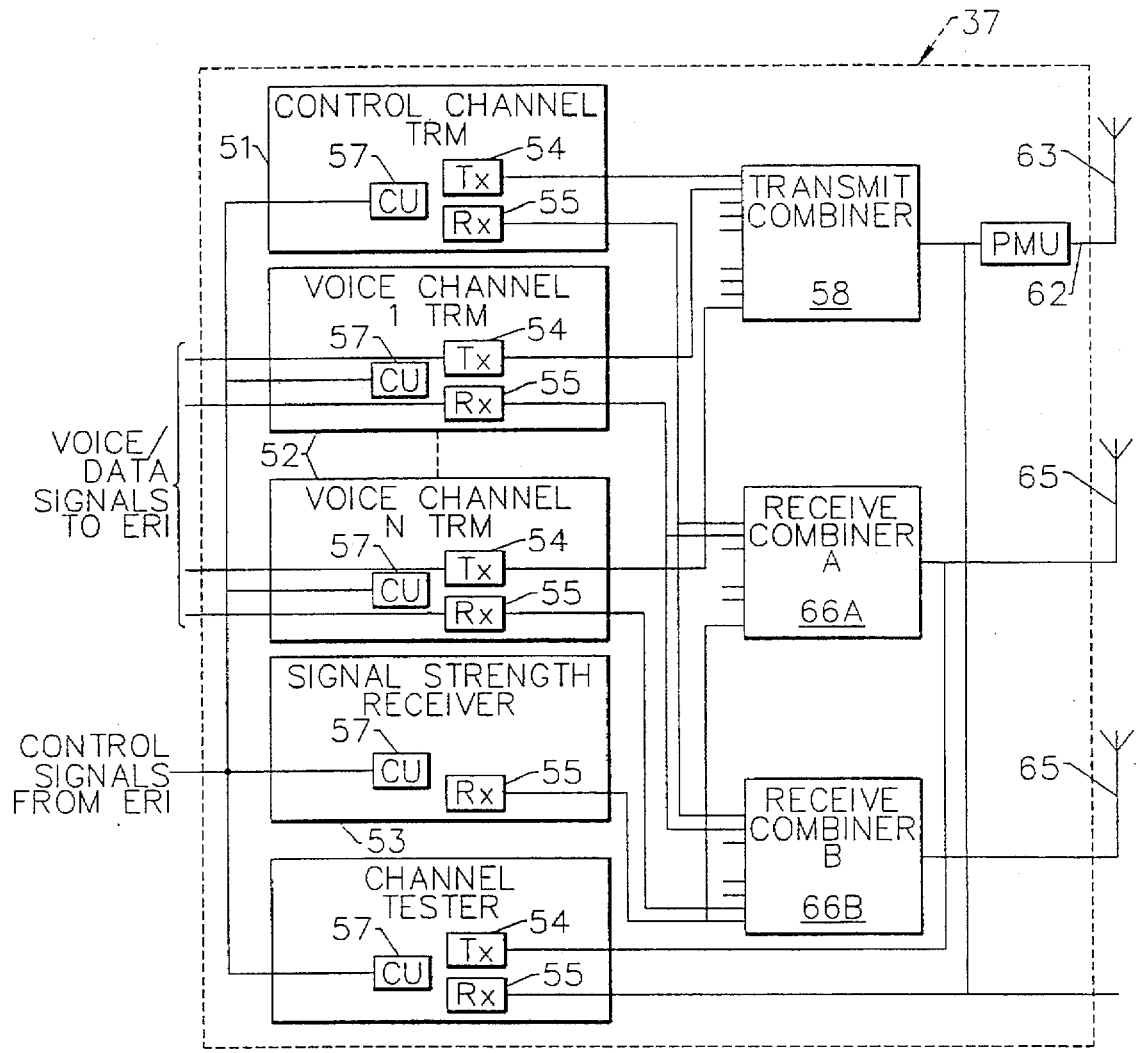
FIG. 3 is a schematic block diagram illustrating the functional elements of Radio Control Group of a base station as in the prior art.
Figure 4A:
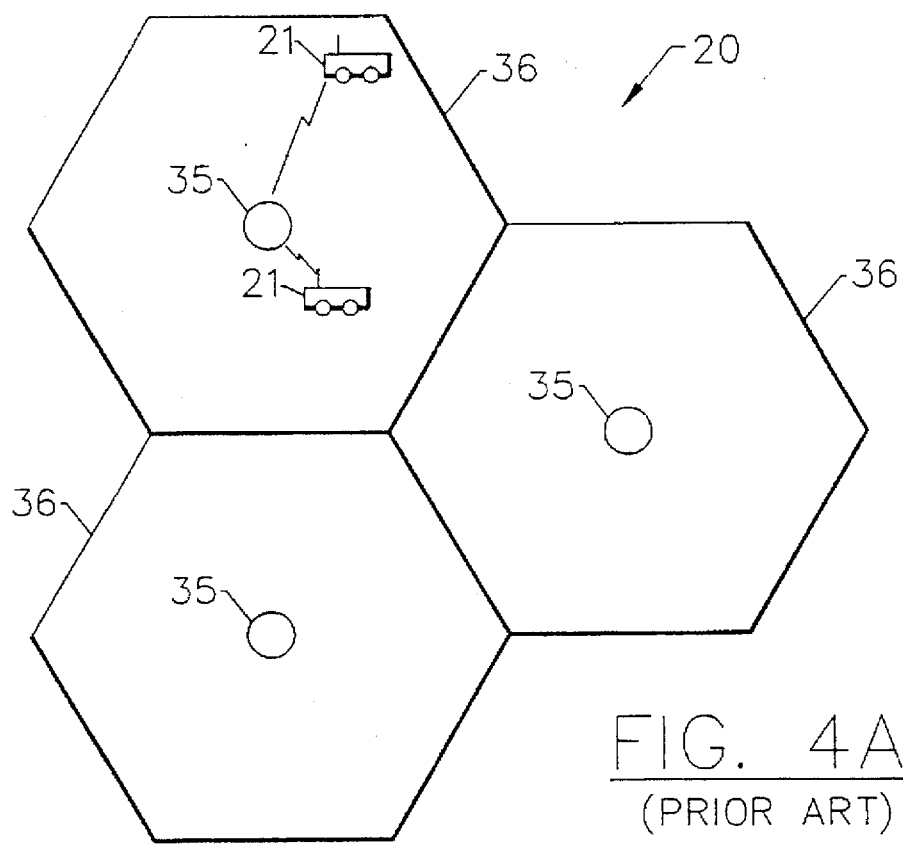
FIG. 4A is a schematic plan view illustrating an omnidirectional cellular pattern as in the prior art.
Figure 4B:
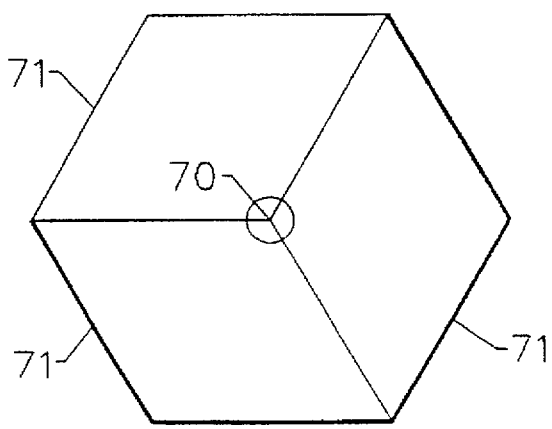
FIG. 4B is a schematic plan view illustrating a sectorized cellular pattern as in the prior art.
Figure 5A:
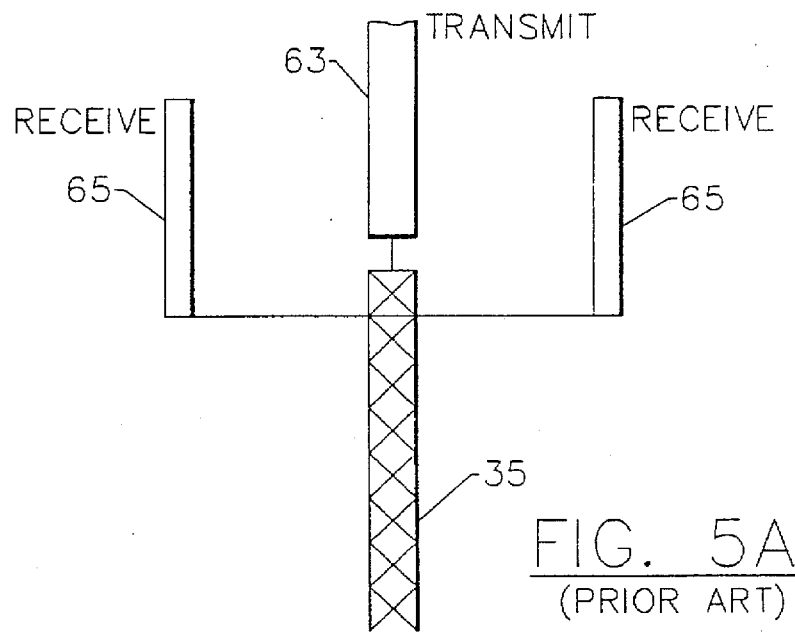
FIG. 5A is a schematic side view illustrating a typical cellular antenna system as in the prior art.
Figure 5B:
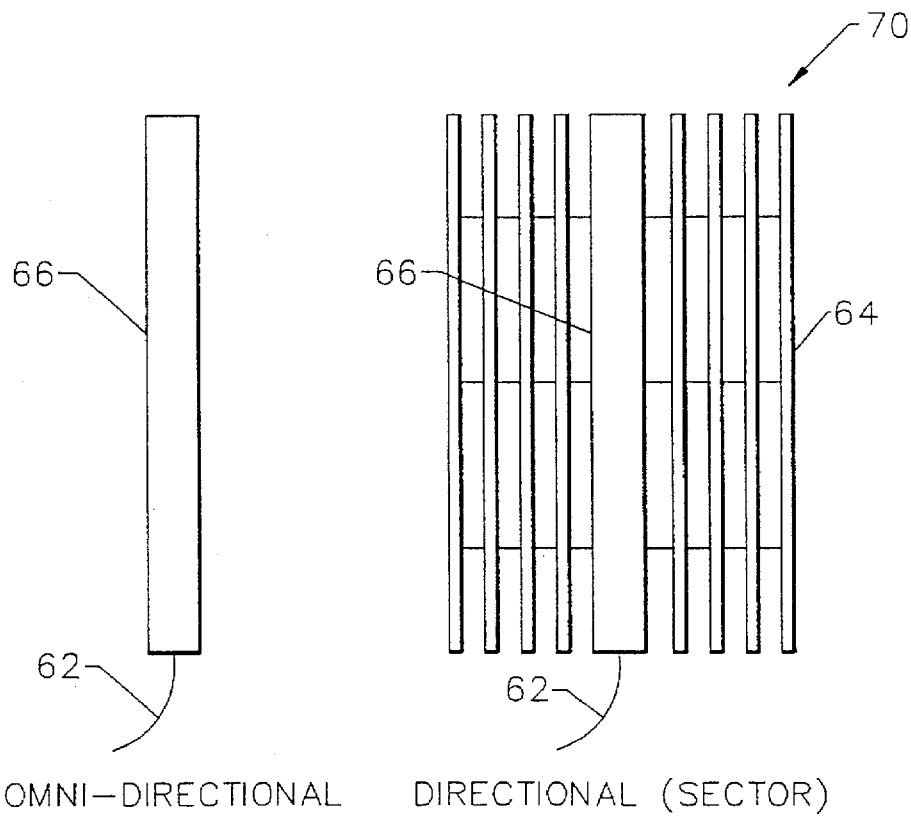
FIG. 5B is a schematic side view illustrating an omnidirectional antenna and a sector antenna as in the prior art.

A base station controller, show in FIG. 2 including radio control group 37 and exchange radio interface 38, can determine for each mobile-base call whether one or the other antenna arrays, or both antenna arrays alternatingly, shall be used for transmitting to the mobile station. This decision can be based on the relative contributions of signals received on the two polarizations as measured in the diversity receivers 214, or on feedback from the mobile station as to whether transmission from one antenna array or another were preferred. For this purpose, a flag bit can be coded into the transmissions to indicate the polarizations of each transmission.

The mobile station 280 includes an antenna 284 for receiving signals transmitted from the cellular base station, and a receiver 286 connected to the antenna for deinterleaving and decoding the signals from the cellular base station to thereby achieve polarization diversity gain. In addition, the interleaved coded signal transmitted from the cellular base station can be a time division multiple access (TDMA) signal, and the receiver can include means for receiving the TDMA signal. The polarization flag mentioned above, if included on a TDMA burst-by-burst basis, can be decoded to indicate the polarization of each burst received.

FIG. 12 also illustrates a method for communicating between a cellular base station and at least one mobile station 280 including the following steps. Signals are alternately transmitted from the base station at respective alternating first and second polarizations. A transmit signal coder 282 can be used to separate a single transmit signal into signals having alternating polarizations and applying the signals having alternating polarizations to respective antenna arrays 210 and 212. The mobile station 280 receives the alternating first and second polarizations and provides polarization diversity gain.

The base station, including the transmit signal coder 282 and antenna arrays 210 and 212, preferably generates coded and interleaved time division multiple access signals for transmission at the alternating first and second polarizations. In addition, the first polarization is preferably right-hand-circular polarization, and the second polarization is preferably left-hand-circular polarization.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A base station for communicating with at least one mobile station in a cellular communications system, said base station comprising:

a first antenna array comprising a first plurality of receive antenna elements for receiving signals having a first polarization and being oriented to define a first receive coverage area;

a second antenna array comprising a second plurality of receive antenna elements for receiving signals having a second polarization different from said first polarization and being oriented to define a second receive coverage area;

antenna mounting means for mounting said first and second antenna arrays so that said first and second receive coverage areas are overlapping; and polarization diversity receiver means connected to said first and second pluralities of receive antenna elements for processing respective first and second receive signals having said first and second polarizations from a mobile station in said overlapping area to generate an enhanced quality output receive signal based upon polarization diversity reception;

wherein said first antenna array further comprises a first plurality of transmit antenna elements arranged in a predetermined pattern for transmitting signals having said second polarization to thereby provide polarization isolation from said first plurality of receive antenna elements; and wherein said second antenna array comprises a second plurality of transmit antenna elements arranged in a predetermined pattern for transmitting signals having said first polarization to thereby provide polarization isolation from said second plurality of receive antenna elements.

2. An apparatus according to claim 1 wherein said polarization diversity receiver means comprises signal quality determining means for determining signal-to-noise ratios of said first and second receive signals, and weighting means for weighting said first and second receive signals based upon said respective signal-to-noise ratios thereof to generate the enhanced quality output receive signal.

3. A base station according to claim 1 wherein said polarization diversity receiver means further comprises means for separating said first and second receive signals into a plurality of respective individual channels based upon frequency and for processing each of said individual channels to generate a respective enhanced quality output receive signal.

4. A base station according to claim 1 wherein said polarization diversity receiver means further comprises means for separating said first and second receive signals into a plurality of respective individual channels based upon time slot and for processing each of said individual channels to generate a respective enhanced quality output receive signal.

5. A base station according to claim 1 wherein a respective one of said receive antenna elements of said first antenna array and a respective one of said transmit antenna elements of said first antenna array are provided on a common patch antenna for receiving signals having said first polarization and transmitting signals having said second polarization.

6. A base station according to claim 1 further comprising alternating polarization transmitter means connected to said first and second pluralities of transmitter antenna elements for alternately transmitting signals at respective alternating first and second rotational polarizations to provide enhanced received signal quality at a mobile station.

7. A base station according to claim 6 further comprising transmitter coding means connected to said alternating polarization transmitter means for generating coded and interleaved time division multiple access signals transmitted from said first and second antenna arrays to a mobile station.

8. A base station according to claim 1 wherein said first antenna array comprises an elongate substrate carrying said first plurality of receive antenna elements and said first plurality of transmit antenna elements extending in a vertical direction; and wherein said second antenna array comprises a second elongate substrate adjacent said first elongate substrate and carrying said second plurality of receive antenna elements and said second plurality of transmit antenna elements extending in a vertical direction.

9. A base station according to claim 8 wherein each of said first and second antenna arrays further comprises a plurality of transmit amplifiers on said elongate substrate and connected to respective transmit antenna elements to thereby define an active phased array antenna.

10. A base station according to claim 8 wherein each receive antenna element comprises an electrically conductive portion on a respective elongate substrate, and wherein each transmit antenna element comprises an electrically conductive portion on a respective elongate substrate.

11. A base station according to claim 8 wherein each of said first and second array antennas further comprises receive in-phase coupling means on said elongate substrate and operatively connected to respective receive antenna elements for combining signals therefrom in-phase with one another; and wherein each of said first and second array antennas further comprises transmit in-phase coupling means on said elongate substrate and operatively connected to respective transmit antenna elements for distributing signals delivered thereto in-phase with one another.

12. A base station according to claim 8 wherein each of said first and second antenna arrays further comprises a radio-transparent housing surrounding said elongate substrate.

13. A base station according to claim 1 wherein said first plurality of receive antenna elements comprises means for receiving right-hand-circular polarization, and wherein said second plurality of receive antenna elements comprises means for receiving left-hand-circular polarization.

14. A base station for communicating with at least one mobile station in a cellular communications system, said base station comprising:
   a first antenna array comprising a first elongate substrate and a first plurality of receive antenna elements for receiving signals having a first polarization and being arranged on said first elongate substrate in a predetermined pattern to define a first receive coverage area;
   a second antenna array comprising a second elongate substrate and a second plurality of receive antenna elements for receiving signals having a second polarization different from said first polarization and being arranged on said second elongate substrate in a predetermined pattern to define a second receive coverage area overlapping with said first receive coverage area; and
   polarization diversity receiver means connected to said first and second pluralities of receive antenna elements for processing respective first and second receive signals received from a mobile station to generate an enhanced quality output receive signal based upon polarization diversity reception;
   wherein said first antenna array further comprises a first plurality of transmit antenna elements arranged in a predetermined pattern on said first elongate substrate for transmitting signals having said second polarization to thereby provide polarization isolation from said first plurality of receive antenna elements; and wherein said second antenna array comprises a second plurality of transmit antenna elements arranged in a predetermined pattern on said second elongate substrate for transmitting signals having said first polarization to thereby provide polarization isolation from said second plurality of receive antenna elements.

15. An apparatus according to claim 14 wherein said polarization diversity receiver means comprises signal quality determining means for determining signal-to-noise ratios of said first and second receive signals, and weighting means for weighting said first and second receive signals based upon the respective signal-to-noise ratios thereof to generate the enhanced quality output receive signal.

16. A base station according to claim 14 wherein said polarization diversity receiver means further comprises means for separating said first and second receive signals into a plurality of respective individual channels based upon frequency and for processing each of said individual channels to generate a respective enhanced quality output receive signal.

17. A base station according to claim 14 wherein said polarization diversity receiver means further comprises means for separating said first and second receive signals into a plurality of respective individual channels based upon time slot and for processing each of said individual channels to generate a respective enhanced quality output receive signal.

18. A base station according to claim 14 wherein a respective one of said receive antenna elements of said first antenna array and a respective one of said transmit antenna elements of said first antenna array are provided on a common patch antenna for receiving signals having said first polarization and transmitting signals having said second polarization.

19. A base station according to claim 14 further comprising alternating polarization transmitter means connected to said first and second pluralities of transmitter antenna elements for alternately transmitting signals at respective alternating first and second polarizations to provide enhanced received signal quality at a mobile station.

20. A base station according to claim 19 further comprising transmitter coding means connected to said alternating polarization transmitter means for generating coded and interleaved time division multiple access signals transmitted from said first and second antenna arrays to a mobile station.

21. A base station according to claim 14 wherein each of said first and second antenna arrays further comprises a plurality of transmit amplifiers on said elongate substrate and connected to respective transmit antenna elements to thereby define an active phased array antenna.

22. A base station according to claim 14 wherein each of said first and second array antennas further comprises receive in-phase coupling means on said elongate substrate and operatively connected to respective receive antenna elements for combining signals therefrom in-phase with one another; and wherein each of said first and second array antennas further comprises transmit in-phase coupling means on said elongate substrate and operatively connected to respective transmit antenna elements for distributing signals delivered thereto in-phase with one another.

23. A base station according to claim 14 wherein each of said first and second antenna arrays further comprises a radio-transparent housing surrounding said elongate substrate.

24. A base station according to claim 14 wherein said first plurality of receive antenna elements comprises means for receiving right-hand-circular polarization, and wherein said second plurality of receive antenna elements comprises means for receiving left-hand-circular polarization.

25. A cellular base station for communicating with at least one mobile station in a cellular communications system over one of a plurality of cellular communications channels, said base station comprising:

a first antenna array comprising a first plurality of transmit antenna elements for transmitting signals having a first polarization to the mobile station over the cellular communications channel and being arranged in a predetermined pattern to define a first transmit coverage area;

a second antenna array comprising a second plurality of transmit antenna elements for transmitting signals having a second polarization different from said first polarization to the mobile station over the cellular communications channel and being arranged in a predetermined pattern to have a second transmit coverage area overlapping with said first transmit coverage area; and alternating polarization transmitter means operatively connected to said first and second antenna arrays for alternately transmitting signal segments from said first and second antenna arrays to the mobile station to provide enhanced received signal quality at the mobile station;

wherein said first antenna array further comprises a first plurality of receive antenna elements arranged in a predetermined pattern for receiving signals having said second polarization from the mobile station over the cellular communications channel to thereby provide polarization isolation from said first plurality of transmit antenna elements; and wherein said second antenna array further comprises a second plurality of receive antenna elements arranged in a predetermined pattern for receiving signals having said first polarization from the mobile station over the cellular communications channel to thereby provide polarization isolation from said second plurality of transmit antenna elements.

26. A base station according to claim 25 further comprising transmitter coding means connected to said alternating polarization transmitter means for generating coded and interleaved time division multiple access signals transmitted from said first and second antenna arrays to a mobile station.

27. A base station according to claim 25 wherein said first antenna array comprises an elongate substrate carrying said first plurality of transmit antenna elements extending in a vertical direction; and wherein said second antenna array comprises a second elongate substrate adjacent said first elongate substrate and carrying said second plurality of transmit antenna elements extending in a vertical direction.

28. A base station according to claim 27 wherein each of said first and second antenna arrays further comprises a plurality of transmit amplifiers on said elongate substrate and connected to respective transmit antenna elements to thereby define an active phased array antenna.

29. A base station according to claim 27 wherein each of said first and second array antennas further comprises transmit in-phase coupling means on said elongate substrate and operatively connected to respective transmit antenna elements for combining signals delivered thereto in-phase with one another.

30. A base station according to claim 27 wherein each of said first and second antenna arrays further comprises a radio-transparent housing surrounding said elongate substrate.

31. A base station according to claim 25 wherein said first plurality of transmit antenna elements comprises means for transmitting left-hand-circular polarization, and wherein said second plurality of transmit antenna elements comprises means for transmitting right-hand-circular polarization.

32. A base station for communicating with at least one mobile station in a cellular communications system, said base station comprising:

a first antenna array comprising a first plurality of receive antenna elements for receiving signals having a first polarization and being arranged in a predetermined pattern to define a first receive coverage area, a first plurality of transmit antenna elements arranged in a predetermined pattern for transmitting signals having a second polarization different from said first polarization to define a first transmit coverage area and to thereby provide polarization isolation from said first plurality of receive antenna elements; a second antenna array comprising a second plurality of receive antenna elements for receiving signals having said second polarization and being arranged in a predetermined pattern to define a second receive coverage area overlapping said first receive coverage area, and a second plurality of transmit antenna elements for transmitting signals having said first polarization and being arranged in a predetermined pattern to define a second transmit coverage area overlapping said first transmit coverage area and to thereby provide polarization isolation from said second plurality of receive antenna elements;

polarization diversity receiver means connected to said first and second pluralities of receive antenna elements for processing respective first and second receive signals received from a mobile station to generate an enhanced quality output receive signal based upon polarization diversity reception; and alternating polarization transmitter means connected to said first and second pluralities of transmitter antenna elements for alternately transmitting signals at respective alternating first and second polarizations to provide enhanced received signal quality at a mobile station.

33. A base station according to claim 32 wherein said polarization diversity receiver means further comprises means for separating said first and second receive signals into a plurality of respective individual channels based upon frequency and for processing each of said individual channels to generate a respective enhanced quality output receive signal.

34. A base station according to claim 32 wherein said polarization diversity receiver means further comprises means for separating said first and second receive signals into a plurality of respective individual channels based upon time slot and for processing each of said individual channels to generate a respective enhanced quality output receive signal.

35. A base station according to claim 32 further comprising transmitter coding means connected to said alternating polarization transmitter means for generating coded and interleaved time division multiple access signals transmitted from said first and second antenna arrays to a mobile station.

36. A base station according to claim 32 wherein said first antenna array comprises an elongate substrate carrying said first plurality of receive antenna elements and said first plurality of transmit antenna elements extending in a vertical direction; and wherein said second antenna array comprises a second elongate substrate adjacent said first elongate substrate and carrying said second plurality of receive antenna elements and said second plurality of transmit antenna elements extending in a vertical direction.

37. A base station according to claim 36 wherein a respective one of said receive antenna elements of said first antenna array and a respective one of said transmit antenna elements of said first antenna array are provided on a common patch antenna for receiving signals having said first polarization and transmitting signals having said second polarization.

38. A method for operating a cellular base station for communicating with at least one mobile station, the method comprising the steps of:

receiving a first signal from a mobile station at a first polarization;

receiving a second signal from said mobile station at a polarization different from said first polarization;

processing said first and second receive signals to generate an enhanced quality output receive signal based upon polarization diversity reception wherein said step of receiving said first signal comprises receiving same via a first plurality of receive antenna elements arranged in a predetermined pattern, and wherein said step of receiving said second signal comprises receiving same via a second plurality of receive antenna elements arranged in a predetermined pattern;

transmitting signals having said second polarization from adjacent said first plurality of receive antenna elements to thereby provide polarization isolation; and transmitting signals having said first polarization from adjacent said second plurality of receive antenna elements to thereby provide polarization isolation.

39. A method according to claim 38 wherein said step of processing comprises determining signal-to-noise ratios of said first and second receive signals, and weighting said first and second receive signals based upon said respective signal-to-noise ratios thereof to generate the enhanced quality output receive signal.

40. A method according to claim 38 further comprising the step of separating said first and second receive signals into a plurality of respective individual channels based upon frequency and processing each of said individual channels to generate a respective enhanced quality output receive signal.

41. A method according to claim 38 further comprising the step of separating said first and second receive signals into a plurality of respective individual channels based upon time slot and processing each of said individual channels to generate a respective enhanced quality output receive signal.

42. A method according to claim 38 wherein said step of receiving said first signal comprises receiving same via a first plurality of receive antenna elements arranged in a predetermined pattern, and wherein said step of receiving said second signal comprises receiving same via a second plurality of receive antenna elements arranged in a predetermined pattern.

43. A method according to claim 38 further comprising the step of alternately transmitting signals at respective alternating first and second polarizations to provide enhanced received signal quality at a mobile station.

44. A method according to claim 43 further comprising the step of generating coded and interleaved time division multiple access signals transmitted to said mobile station.

45. A method according to claim 38 wherein said step of receiving said first polarization comprises receiving right-hand-circular polarization, and wherein said step of receiving said second polarization comprises receiving left-hand-circular polarization.

46. A cellular base station for communicating with at least one mobile station in a cellular communications system over one of a plurality of cellular communications channels, said base station comprising:

a plurality of receive antennas, a first one of said receive antennas for receiving signals having a first polarization from the mobile station over the cellular communications channel and defining a first receive coverage area, and a second one of said receive antennas adjacent said first receive antenna for receiving signals having a second polarization from the mobile station over the cellular communications channel and defining a second receive coverage area;

support means for supporting said plurality of antennas such that said first and second receive antennas are oriented so that said first and second receive coverage areas overlap thereby defining an overlap receive coverage area; and a plurality of polarization diversity receivers, each of said polarization diversity receivers being connected to at least two adjacent receive coverage antennas, a first one of said polarization diversity receivers being connected to said first and second receive antennas for processing respective first and second receive signals having said first and second polarizations and received from the mobile station in said overlap receive coverage area to generate an enhanced quality output receive signal based upon polarization diversity reception;

a plurality of transmit antennas, a first one of said transmit antennas for transmitting signals having said second polarization to the mobile station over the cellular communications channel and defining a first transmit coverage area, and a second one of said transmit antennas for transmitting signals having said first polarization to the mobile station over the cellular communications channel and defining a second transmit coverage area, wherein said support means supports said first and second transmit antennas so that said first and second transmit coverage areas overlap, so that said first receive coverage area and said first transmit coverage area overlap, and so that said second receive coverage area and said second transmit coverage area overlap.

47. A base station according to claim 46 wherein said first polarization comprises right hand circular polarization and said second polarization comprises left hand circular polarization.

48. A cellular base station according to claim 46 wherein said first receive antenna and said first transmit antenna are provided as a first transmit and receive antenna, and wherein said second receive antenna and said second transmit antenna are provided as a second transmit and receive antenna.

49. A base station for communicating with at least one mobile station in a cellular communications system, said base station comprising:

a plurality of antennas, a first one of said antennas receiving signals having a first polarity and transmitting signals having a second polarity and defining a first coverage area, and a second one of said antennas receiving signals having said second polarity and transmitting signals having said first polarity and defining a second coverage area;

support means for supporting said plurality of antennas such that said first and second coverage areas overlap thereby defining an overlap coverage area; and a plurality of polarization diversity receivers, each of said polarization diversity receivers being connected to at least two antennas, one of said polarization diversity receivers being connected to said first and second antennas for processing respective first and second receive signals having said first and second polarizations and received from a mobile station in said overlap coverage area to generate an enhanced quality output receive signal based upon polarization diversity reception.

50. A base station according to claim 49 further comprising:

transmit means connected to each of said antennas, said transmit means providing said first transmit signals having said second polarity to said first antenna and providing said second transmit signals having said first polarity to said second antenna; and control means connected to said transmit means for alternately providing said first transmit signal to said first antenna and said second transmit signal to said second antenna so that a mobile station in said overlap coverage area alternately receives said first transmit signal having said second polarity and said second transmit signal having said second polarity.

51. A base station according to claim 50 wherein said control means alternately provides said first transmit signal to said first antenna and said second transmit signal to said second antenna based on said first and second receive signals received by said polarization diversity receiver connected to said first and second antennas.

52. A cellular base station for communicating with at least one mobile station in a cellular communications system over one of a plurality of cellular communications channels, said base station comprising:

a first antenna defining a first coverage area, wherein said first antenna receives signals having a first polarization from the mobile station over the cellular communications channel and transmits signals having a second polarization to the mobile station over the cellular communications channel to thereby provide polarization isolation;

a second antenna adjacent said first antenna defining a second coverage area, wherein said second antenna receives signals having said second polarization from the mobile station over the cellular communications channel and transmits signals having said first polarization to the mobile station over the cellular communications channel to thereby provide polarization isolation; and support means for supporting said first and second receive antennas so that said first and second coverage areas overlap thereby defining an overlap coverage area.

53. A cellular base station according to claim 52 further comprising a polarization diversity receiver connected to said first and second antennas for processing respective first and second receive signals having said first and second polarizations and received from the mobile station in said overlap coverage area to generate an enhanced quality output receive signal based upon polarization diversity reception.

54. A cellular base station according to claim 52 further comprising alternating polarization transmitter means operatively connected to said first and second antennas for alternately transmitting signal segments from said first and second antennas to the mobile station to provide enhanced received signal quality at the mobile station.

* * * * *

UNITED STATES PATENT AND TRADEMARK OFFICE
CERTIFICATE OF CORRECTION

PATENT NO. : 5,724,666  
DATED : March 3, 1998  
INVENTOR(S) : Paul W. Dent

Page 1 of 2

It is certified that error appears in the above-identified patent and that said Letters Patent is hereby corrected as shown below:

On the Cover Page

[56] References Cited - U.S. Patent Documents - Add the following:

"5,339,086  8/1994   DeLuca et al."
"5,276,452  1/1994   Schuss et al."
"5,200,759  4/1993   McGinnis"

"5,187,807  2/1993   Alard et al."
"5,166,693  11/1992  Nishikawa et al."
"4,823,136  4/1989   Nathanson et al."
"4,814,773  3/1989   Wechsberg et al."
"4,724,441  2/1988   Fithian et al."
"4,630,316  12/1986  Vaughan"
"4,204,093  5/1980   Yeh"
"4,128,740  12/1978  Graziano"
"4,101,836  7/1978   Craig et al."
"4,072,956  2/1978   Provencher"

[56] References Cited - Foreign Patent Documents - Add the following:
"WO 92/02996  8/1991  PCT Countries

[56] References Cited - Other Publications  
Line 1    Change "Communictions" to -- Communications --.
Add the following:
"Donald C. Cox, et al., *Cross-Polarization Coupling Measured for 800 MHz Radio Transmission In and Around Houses and Large Buildings*, IEEE Transactions On Antennas and Propagation, Vol. AP-34, No. 1, January 1986, pp. 83-87."
"John L. Everett, *Potential developments in hand-held satellite communication terminals*, European Satellite Communications 89: Blenheim Online Publications, Pinner, Middx, UK. 1989, pp. 25-34."
"Jean-Francois Lemieux, et al., *"Experimental Evaluation of Space/Frequency/Polarization Diversity in the Indoor Wireless Channel*, IEEE Transactions on Vehicular Technology, Vol. 40, No. 3, August 1991, pp. 569-574."

UNITED STATES PATENT AND TRADEMARK OFFICE
CERTIFICATE OF CORRECTION

PATENT NO. : 5,724,666
DATED : March 3, 1998
INVENTOR(S) : Paul W. Dent

It is certified that error appears in the above-identified patent and that said Letters Patent is hereby corrected as shown below:

[56] References Cited - Other Publications - Continued - Add the Following:

"Carlo Caini, et al., *A Spectrum- and Power-Efficient EHF Mobile Satellite System to be Integrated with Terrestrial Cellular Systems*, IEEE Journal on Selected Areas in Communications, Vol. 10, No. 8, October 1992, pp. 1315-1325."
"Donald C. Cox, *Antenna Diversity Performance in Mitigating the Effects of Portable Radiotelephone Orientation and Multipath Propagation*, IEEE Transactions on Communications, Vol. Com-31, No. 5, May 1983, pp. 620-628."
"P.S. Henry, et al., *A New Approach to High-Capacity Digital Mobile Radio*, American Telephone and Telegraph Company, The Bell System Technical Journal, Vol. 60, No. 8, October 1981, pp. 1891-1904."
"S.P. Stapleton, et al., *A Cellular Base Station Phased Array Antenna System*, IEEE, 1993, pp. 93-96"
"*Polarisation Diversity in Portable Communications Environment*, Electronics Letter, Vol. 22, No. 11, May 22, 1986, pp. 609-610."

Column 19, Line 7   At the end of the line, delete the paragraph break, so as to read "having said first"

Signed and Sealed this

Ninth Day of March, 1999

Attest:

Q. TODD DICKINSON

*Attesting Officer*   Acting Commissioner of Patents and Trademarks